Patented Dec. 6, 1932

1,889,944

UNITED STATES PATENT OFFICE

GEORGE BARSKY, OF NEW YORK, N. Y., ASSIGNOR TO AMERICAN CYANAMID COMPANY, OF NEW YORK, N. Y., A CORPORATION OF MAINE

METHOD OF MAKING UREA

No Drawing.    Application filed May 13, 1930.   Serial No. 452,136.

This invention relates to the production of urea from a cyanamid of an alkali earth metal, such as calcium cyanamid.

It has been proposed to manufacture urea from calcium and similar cyanamids, taking advantage of a well-known reaction wherein free cyanamide in solution can be made to polymerize to form urea, under acid conditions.

In this type of process it is necessary to extract the calcium cyanamide with water, precipitate the calcium, for example, as calcium sulfate or calcium carbonate, add acid and to heat until the cyanamide is converted to urea. Various by-products and low yields are obtained principally because of polymerization to dicyandiamide taking place. The dicyandiamide formation is due to reaction between cyanamide molecules and cyanamide ions, the cyanamide molecules being formed by the hydrolysis of the calcium cyanamide, the salt of the weak acid and a weak base.

The present invention is designed to overcome the disadvantages inherent in the acid method of producing urea from cyanamid and I have devised a very simple and effective procedure for accomplishing this result.

I have discovered that if the cyanamide salt of an alkali metal is used, the cyanamid will hydrolyze quantitatively to urea with a resulting formation of alkali metal hydroxide. No by-products are formed since the strong alkali keeps all cyanamide in the form of the ion. To utilize this discovery in a commercial process I proceed as follows: I provide the solution of an alkali metal salt such as sodium carbonate or sodium sulfate, the anion of which will react with calcium cyanamide to form the alkali metal acid cyanamide and an insoluble calcium salt. To this solution I add a slight deficiency of calcium cyanamide.

The mixture is heated to a temperature less than 100° C. and preferably in the neighborhood of 60 to 80 degrees C., with effective stirring thereof. The reaction proceeds at a moderate velocity, the calcium being precipitated out as calcium hydroxide, carbonate or sulfate, and the cyanamid being gradually converted into urea, the sodium ions remaining in solution as sodium hydroxide, in accordance with the following equations:

(1) 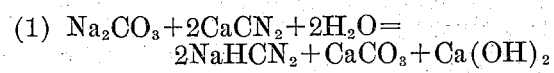

(2) $NaHCN_2 + 2H_2O = NaOH + CO(NH_2)_2$

The important feature of my procedure is the maintenance of an amount of cyanamid ions (HNCN) approximately equal to and not greater than the amount of sodium ions in the solution. At the beginning of the reaction the proper ratio is present, but as the cyanamid is converted into urea the sodium ions predominate and, therefore, it is necessary to maintain the proper ratio by adding sufficient calcium cyanamid. The course of the reaction may be determined periodically by analyzing the solution for cyanamid ions by any desired standard method, but I generally prefer to titrate for cyanamid content by the well-known standard silver method.

This procedure may be continued almost indefinitely by the maintenance of the proper temperature and the proper ratio of one ion of cyanamid to one ion of alkali, until the desired amount of urea is formed. The reaction between the added calcium cyanamid and the solution is designated by the following equation:

(3) 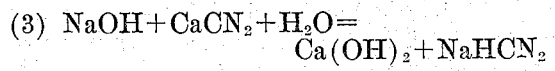

It will be noted that upon the addition of the calcium cyanamid, insoluble calcium compounds are formed and these may either be allowed to remain in the solution, and removed at the end of the reaction, or the precipitates may be removed from time to time as desired.

Although the reaction proceeds normally at a moderate rate, it is desirable in many instances to speed up the reaction and this may be accomplished by the addition of suitable catalyzers in small amounts to the solution. However, in many cases it may be desirable to not speed up the reaction in order that the control of the ion ratio described above may be more accurate and complete.

From the above it will be apparent that I have devised a procedure for producing urea in which a relatively small amount of an alkali may be used to produce a large amount of urea and if desired the original amount of alkali may be used indefinitely, barring the normal losses that occur in conducting chemical reactions. In any case my process reduces the cost of the alkali to an extremely small amount and thereby renders the production of urea by this method economical and efficient.

Although I have described my invention setting forth a specific example thereof, it is understood that my invention is not limited to the details described. For example, although I generally use calcium cyanamid and have claimed calcium cyanamid, I may use equivalent substances, such as barium or strontium cyanamid. In place of the sodium salts mentioned, salts of other alkali metals may be used, and I may even start with the free alkalis instead of with the salts of the alkali metals, but the alkali metal compound used should have an anion which forms an insoluble salt with the calcium ion, such as hydroxide, phosphate, sulphate, etc.

This and other changes may be made in my invention, the scope of which is set forth in the claims appended hereto.

What I claim is:

1. A method of making urea which comprises providing a water solution of a compound of an alkali metal with a negative radical capable of forming a water insoluble compound with calcium, adding calcium cyanamid thereto, heating the mixture and maintaining a ratio of cyanamid ions to alkali metal ions in the solution such that all cyanamid is in the form of the ion.

2. A method of making urea which comprises providing a water solution of a compound of an alkali metal with a negative radical capable of forming a water insoluble compound with calcium, adding calcium cyanamid thereto, heating the mixture to a temperature below 100° C., and maintaining approximately a one to one ratio of cyanamid ions to alkali metal ions in the solution.

3. A method of making urea which comprises providing a water solution of a compound of an alkali metal with a negative radical capable of forming a water insoluble compound with calcium, adding calcium cyanamid thereto, heating the mixture and maintaining approximately a one to one ratio of cyanamid ions to alkali metal ions in the solution, by periodically determining the cyanamid ion content and adding sufficient calcium cyanamid to supply any deficiency of cyanamid ions in the ratio.

4. A method of making urea which comprises providing a water solution of a compound of an alkali metal with a negative radical capable of forming a water insoluble compound with calcium, adding calcium cyanamid thereto, heating the mixture and maintaining a substantially one to one ratio of cyanamid ion to alkali metal ions in the solution.

5. A method of making urea which comprises providing a water solution of a compound of an alkali metal with a negative radical capable of forming a water insoluble compound with calcium, adding calcium cyanamid thereto, heating the mixture, maintaining approximately a one to one ratio of cyanamid ions to alkali metal ions in the solution, and continually adding sufficient calcium cyanamid until the desired amount of urea has been formed.

6. A method of making urea which comprises providing a water solution of a compound of an alkali metal with a negative radical capable of forming a water insoluble compound with calcium, adding calcium cyanamid thereto, heating the mixture and maintaining approximately a one to one ratio of cyanamid ions to alkali metal ions in the solution and removing precipitated calcium compounds from the solution.

In testimony whereof, I have hereunto subscribed by name this 9th day of May 1930.

GEORGE BARSKY.